May 22, 1962 B. KELLEY ETAL 3,035,643
DEVICE TO ALTER DYNAMIC CHARACTERISTICS OF ROTOR SYSTEMS
Filed Oct. 13, 1959 2 Sheets-Sheet 1
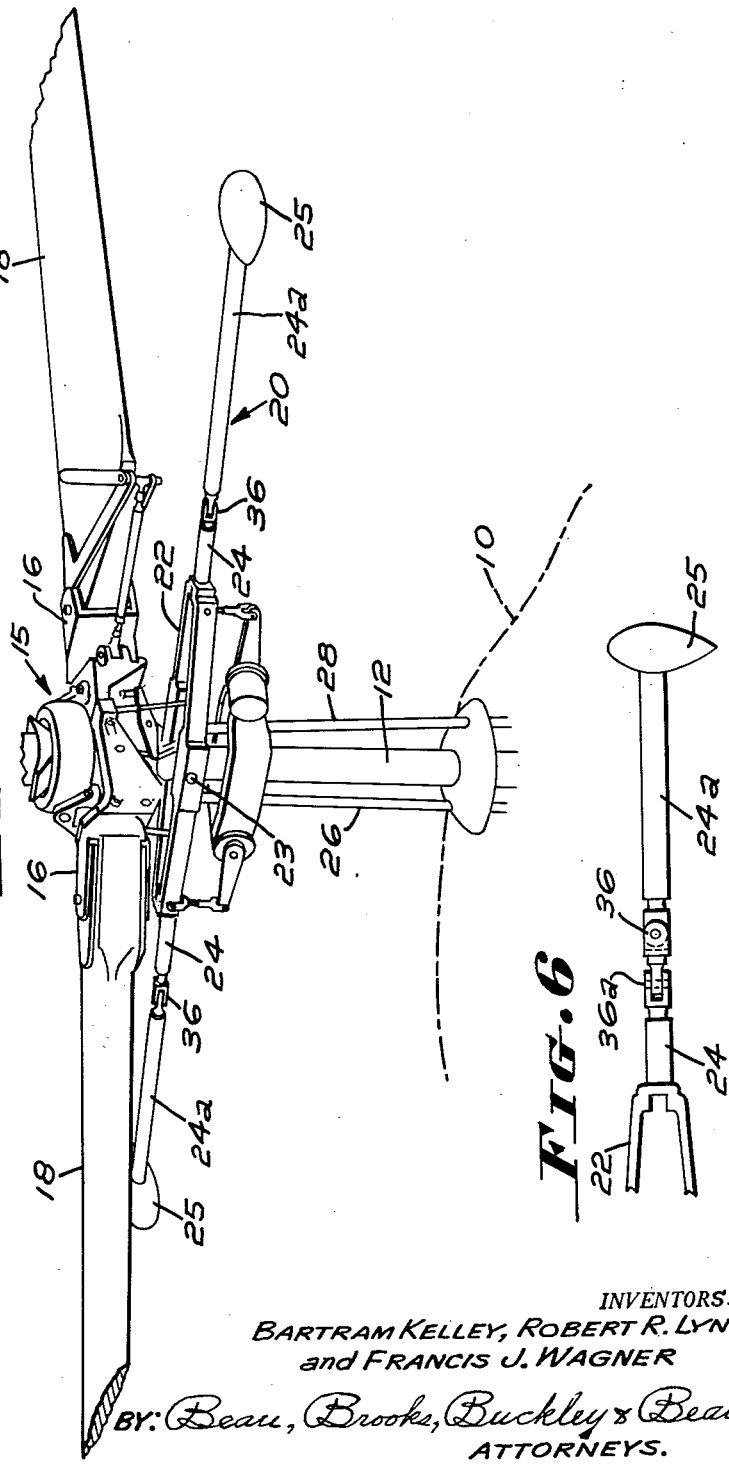
INVENTORS:
BARTRAM KELLEY, ROBERT R. LYNN
and FRANCIS J. WAGNER
BY: Beau, Brooks, Buckley & Beau,
ATTORNEYS.

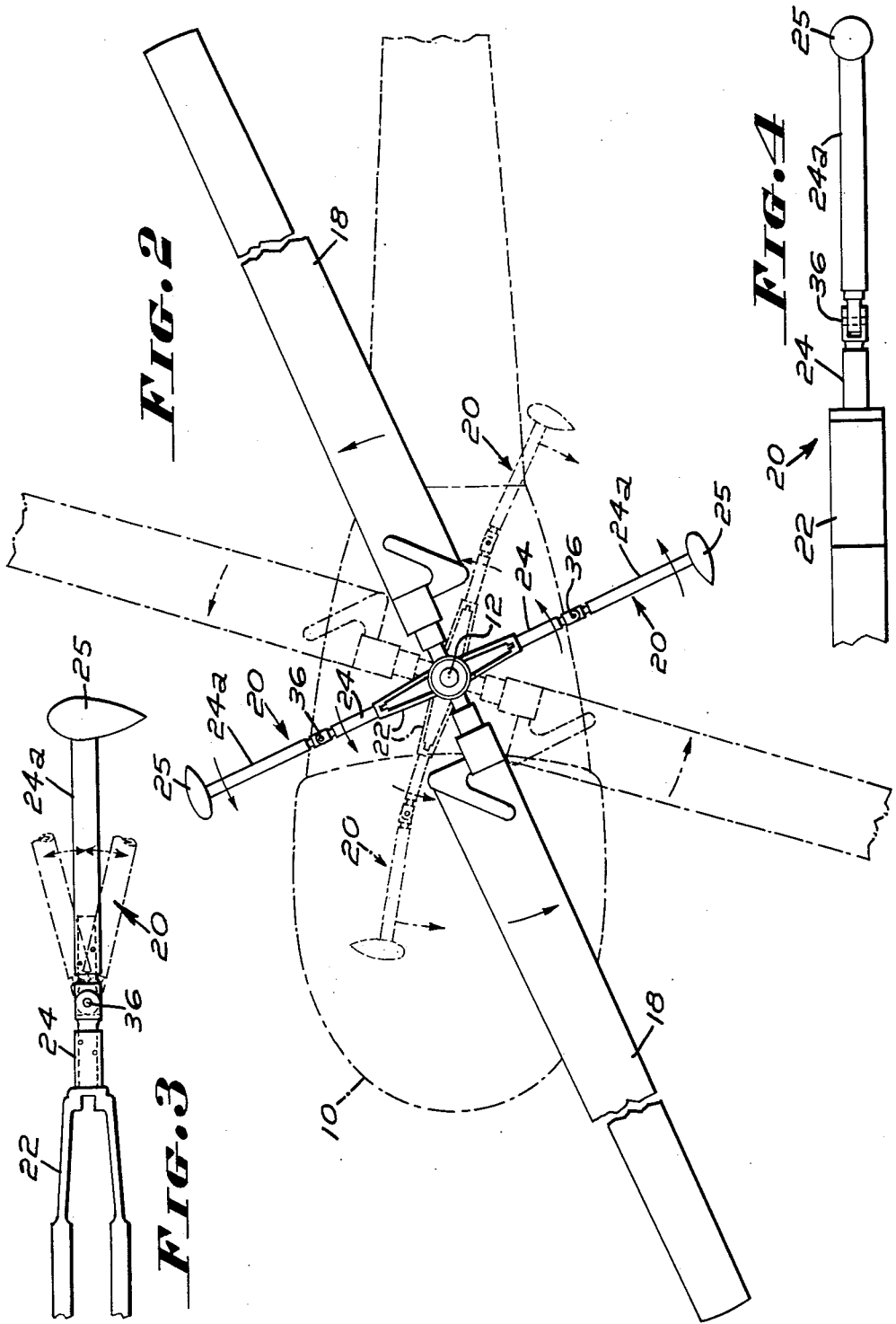

United States Patent Office 3,035,643
Patented May 22, 1962

3,035,643
DEVICE TO ALTER DYNAMIC CHARACTERISTICS OF ROTOR SYSTEMS
Bartram Kelley, Dallas, and Robert R. Lynn and Francis J. Wagner, Arlington, Tex., assignors, by mesne assignments, to Bell Aerospace Corporation, Wheatfield, N.Y., a corporation of Delaware
Filed Oct. 13, 1959, Ser. No. 846,164
4 Claims. (Cl. 170—160.13)

This invention relates to rotary wing aircraft, and more particularly to helicopter type aircraft and to improvements therein whereby to reduce rotor and/or control load and/or to reduce fuselage vibration.

The related problems of rotor and control loads and fuselage vibration have been matters of extreme concern to the helicopter industry for many years. Considerable time and money have been expended in efforts to reduce such loads and vibrations, and some degrees of success have been achieved. However, it is well recognized in the art that further development of the helicopter must be accompanied by further solutions to these problems of loads and vibrations. It is known that several sources contribute to the phenomenon of fuselage vibration, and that major causes of this vibration are the rotor vertical and/or in-plane vibrating forces experienced in translational flight. These rotor vertical and in-plane vibrating forces are transmitted through the rotor mast and pylon system into the helicopter fuselage and are reflected in high loads on the rotor and/or control system, contributing to fatigue deterioration of highly loaded components such as the rotor blades, blade grips, control yokes, swashplate, control rods, etc.

It is an object of the present invention to provide in a helicopter aircraft an arrangement for reducing rotor and/or control loads, thereby increasing the fatigue life of helicopter components and permitting component designs for lower stress levels and less weight.

Another object is to provide in a helicopter aircraft an arrangement to reduce fuselage vibrations, thereby improving the fuselage ride characteristics.

Another object is to provide an arrangement as aforesaid which through the use of only slightly modified existing masses in the rotating system will operate automatically to favorably alter the dynamic behavior of the rotor pylon system, regardless of rotor speed.

Other objects and advantages of the invention will appear from the specification hereinafter including by way of exemplification of the invention the accompanying drawings wherein:

FIG. 1 is a fragmentary perspective view of a two-bladed semi-rigid rotor system embodying one form of the invention;

FIG. 2 is a top plan view of the form of the invention shown in FIG. 1, illustrating schematically operation of the invention;

FIG. 3 is a fragmentary view on enlarged scale, of a portion of FIG. 2;

FIG. 4 is a side elevational view of the mechanism of FIG. 3;

FIG. 5 is a fragmentary view, similar to FIG. 3, of another form of the invention; and FIG. 6 is a fragmentary view corresponding to FIGS. 3, 5, showing still another form of the invention.

As shown in the drawing herewith, the invention is provided in conjunction with a helicopter aircraft comprising generally a fuselage 10 mounting a rotor mast 12 upon the top end of which is carried a rotor hub arrangement as indicated generally at 15. As shown, the hub 15 may be, but is not restricted to, the dual gimbal ring type, the outer ring of which carries the rotor blade grips as indicated at 16 from which extend the rotor blades 18—18. The hub may also be of the single gimbal ring type and it is to be understood that the invention is not restricted to any particular type of rotor hub construction. Nor is the invention restricted to a rotor of any certain number of blades, although there are particular and more extensive benefits to be derived from application of the invention to the type of helicopter rotor employing a "fly-bar" stabilizing arrangement as disclosed and explained for example in U.S. Patent No. 2,368,698. As explained in detail in said patent, a helicopter can be arranged to be stabilized and controlled for maneuvering purposes through means of a transversely extending "fly-bar" as indicated in the drawing herewith at 20. This "fly-bar" comprises a central yoke portion 22 which is pivotally mounted upon the mast 12 along axis 23 and is provided with extension arms 24—24 and 24a—24a terminating in streamlined masses 25—25 as explained in the aforementioned patent. The rotor blade pitch change control horns are interconnected with the "fly-bar" mechanism and with push-pull members as indicated at 26-28 (FIG. 1) leading to the manual pilot controls, whereby the inertia of the "fly-bar" mechanism operates automatically to stabilize the rotor in an established plane of rotation while the rotor is at all times controllable for maneuvering purposes by manual manipulation of the pilot controls.

The present invention contemplates employment in conjunction with a rotor system, of a substantially free-pendulum device which is attached to the rotating system and tuned so that the dynamic characteristics of the rotor-pylon system are altered favorably to decrease rotor loads and/or fuselage vibrations. One form of suitable device for the above stated purpose is illustrated in FIG. 1 wherein the rotor structure of the type disclosed and explained in Patent 2,368,698 is employed. This arrangement is characterized by the fact that no new parts are added to the rotor system and that already existing components are utilized to favorably alter the dynamic characteristics of the rotor system to thereby reduce loads and vibrations. In this case the "fly-bar" arms 24—24 are equipped with free-hinges as indicated at 36—36 located approximately midway between the center of the mast 12 and the centers of inertia masses 25—25; the hinge pivots being arranged to have vertical axes. Hence, the outer ends 24a of the "fly-bar" arms carrying the inertia weights 25—25 are free to oscillate about the pivots 36—36 in lead-lag relation to the central or yoke portion 22 of the "fly-bar" device, and hence in similar relation to the main rotor system as the latter rotates about the vertical center line of the mast 12.

The pendulum sections of the fly bar comprising extension arms 24a—24a and the inertia masses 25—25 must be properly "tuned," and it will be appreciated that tuning of these free pendulums may be affected by varying the locations of the pivots 36—36, and that the optimum location may be determined either empirically or mathematically. The optimum location of the pivots is that location which will most effectively minimize a particular frequency of fuselage vibration. It is conventional to describe fuselage vibrations in terms of the rotor r.p.m. A fuselage vibration designated as 2:1 signifies a vibration of the fuselage with a frequency twice the rotor r.p.m. If the rotor is rotating at 200 revolutions per minute, then a 2:1 fuselage vibration would be at a frequency of 400 cycles per minute. Correspondingly, a fuselage vibration designated as 4:1 signifies a vibration of the fuselage with a frequency four times the rotor r.p.m. For example, it has been determined that 2:1 fuselage vibrations are most successfully minimized by locating the hinge pins of an arrangement as shown in FIG. 1 so that the pendulum natural rotational frequency is near rotor speed; whereas for 4:1 fuselage vibrations of the hinges 36—36 would be located so that the pendulum natural rotational frequency would be three times that of the rotor speed. But, in any case the location of the hinges for a specific purpose can be readily determined.

Another form of the invention, also utilizing existing components, is shown in FIG. 5 wherein the hinge pivots as indicated at 36a—36a are arranged to have horizontal axes. Whereas the axes 36—36 of FIG. 1 are disposed vertically to alter the dynamic characteristics of the rotor system so as to correct or minimize rotor in-plane loads, the horizontal disposition of the axes 36a—36a corrects or minimizes vibrations generally perpendicular to the rotor plane such as may arise for example from the vertical thrust pulsations of the rotor. Tuning of the vertical pendulum effect is accomplished in the same manner as for the "horizontal" pendulum effect by proper positioning of the free hinges 36a—36a.

The arrangements shown in FIGS. 1–4 and 5 may be used singly or in combination. One form of use in combination is shown in FIG. 6. It appears that the in-plane form of the invention dealing with the in-plane vibrating forces as shown in FIG. 1 wherein the pendular device is attached to the mast or hub, and wherein the axes 36—36 are vertically disposed, is of less efficacy in connection with a rotor having three or more blades. However, it does appear that the vertical forces in a rotor having three or more blades can be accommodated to excellent advantage by utilization of the general form of the invention shown in FIG. 5 wherein the pendular device is attached to the mast or hub, and wherein the axes 36a—36a are horizontally disposed. The present invention is also fully applicable to those helicopters not employing components such as the "fly-bar" referred to hereinabove, and which are therefore readily adaptable at minimal, if any, increase of weight or parts. In such cases additional components may be added to the structure to achieve the result of altering the dynamic characteristics of the rotor system in the manner as disclosed herein.

Therefore it will be understood that whereas only a few forms of the invention have been illustrated and described in detail hereinabove, the components of the rotor system as illustrated and described herein may be modified or otherwise employed in lieu of the arrangements discussed hereinabove; and that various other changes may be made in the devices as shown without departing from the spirit of the invention or the scope of the appended claims.

What is claimed is:

1. In a helicopter aircraft, in combination, a rotor-supporting mast, a rotor including a blade extending radially of said mast, means mounting said blade on said mast for rocking movements of the blade both about an axis transverse to the longitudinal axis of said blade and about its longitudinal axis, means for cyclically varying the pitch of said blade, rotating inertia means including a base member and a weighted extension member, means pivotally mounting said base member upon said mast about an axis transverse thereto for rocking movement of the inertia means independent of said rotor, articulating means connecting said extension member to said base member at a position outboard of said means pivotally mounting said base member upon said mast, means interconnecting said inertia means and said rotor to control the inclination of the plane of rotation of said rotor, said articulating means being disposed to permit said weighted extension member to oscillate substantially in the plane of its rotation about said articulating means as an axis.

2. In the aircraft as defined in claim 1 wherein said weighted extension member is in the form of a bar extending outwardly from said base member and having a weight fixed to the outer end thereof, said articulating means being in the form of a pivot connection having its axis generally vertical and spaced radially inwardly of said weight.

3. In the aircraft as defined in claim 2 wherein said articulating means also has a pivot axis generally horizontally disposed.

4. In a helicopter aircraft, in combination, a rotor-supporting mast, a rotor including a blade extending radially of said mast, means mounting said blade on said mast for rocking movements of the blade both about an axis transverse to the longitudinal axis of said blade and about its longitudinal axis, means for cyclically varying the pitch of said blade, rotating inertia means including a base member and a weighted extension member, means pivotally mounting said base member upon said mast about an axis transverse thereto for rocking movement of the inertia means independent of said rotor, articulating means connecting said extension member to said base member at a position outboard of said means pivotally mounting said base member upon said mast, means interconnecting said inertia means and said rotor to control the inclination of the plane of rotation of said rotor, said articulating means being disposed to permit said weighted extension to oscillate about said articulating means as an axis in directions substantially normal to the plane of its rotation.

References Cited in the file of this patent
FOREIGN PATENTS

| | | |
|---|---|---|
| 590,011 | Great Britain | July 7, 1947 |
| 536,673 | Canada | Feb. 5, 1957 |